(12) United States Patent
Franchet et al.

(10) Patent No.: US 8,871,308 B2
(45) Date of Patent: Oct. 28, 2014

(54) METHOD AND A DEVICE FOR COATING CERAMIC MATERIAL FIBERS IN METAL BY A LIQUID TECHNIQUE

(75) Inventors: Jean-Michel Patrick Maurice Franchet, Paris (FR); Gilles Charles Casimir Klein, Mery sur Oise (FR); Gerald Sanchez, Annecy (FR)

(73) Assignee: Snecma, Paris (FR)

( * ) Notice: Subject to any disclaimer, the term of this patent is extended or adjusted under 35 U.S.C. 154(b) by 301 days.

(21) Appl. No.: 13/322,063

(22) PCT Filed: Apr. 20, 2010

(86) PCT No.: PCT/FR2010/050753
§ 371 (c)(1),
(2), (4) Date: Nov. 22, 2011

(87) PCT Pub. No.: WO2010/136687
PCT Pub. Date: Dec. 2, 2010

(65) Prior Publication Data
US 2012/0064254 A1 Mar. 15, 2012

(30) Foreign Application Priority Data
May 25, 2009 (FR) ..................................... 09 53415

(51) Int. Cl.
| C23C 2/00 | (2006.01) |
|---|---|
| C04B 41/45 | (2006.01) |
| C04B 41/00 | (2006.01) |
| C04B 41/88 | (2006.01) |
| C22C 47/04 | (2006.01) |
| C23C 2/24 | (2006.01) |
| C23C 2/38 | (2006.01) |
| C04B 111/00 | (2006.01) |

(52) U.S. Cl.
CPC ......... *C04B 41/4584* (2013.01); *B05D 2256/00* (2013.01); *B05D 2203/30* (2013.01); *B22F 2999/00* (2013.01); *C04B 41/009* (2013.01); *C04B 41/88* (2013.01); *C04B 2111/00931* (2013.01); *C04B 2111/00982* (2013.01); *C22C 47/04* (2013.01); *C23C 2/003* (2013.01); *C23C 2/24* (2013.01); *C23C 2/38* (2013.01)
USPC ...................... 427/434.7; 427/431; 427/434.6

(58) Field of Classification Search
None
See application file for complete search history.

(56) References Cited

U.S. PATENT DOCUMENTS

| 6,174,570 B1 | 1/2001 | Dambrine et al. |
|---|---|---|
| 7,687,114 B2 | 3/2010 | Franchet et al. |

(Continued)

FOREIGN PATENT DOCUMENTS

| EP | 0 931 846 | 7/1999 |
|---|---|---|
| EP | 1 995 342 | 11/2008 |

OTHER PUBLICATIONS

International Search Report Issued on Jul. 20, 2010 in PCT/FR2010/050753 filed Apr. 20, 2010.

*Primary Examiner* — David Turocy
(74) *Attorney, Agent, or Firm* — Oblon, Spivak, McClelland, Maier & Neustadt, L.L.P.

(57) ABSTRACT

A method of coating ceramic material fibers in metal using a liquid technique and a device implementing the method. The method maintains a charge of molten metal in levitation in a substantially spherical shape inside a crucible and causes a tensioned ceramic material fiber to travel at a predetermined speed between a bottom pulley and a top pulley disposed on either side of the crucible such that a portion of fiber is immersed in the charge to be covered in a metal coating. During coating, the portion of fiber that is immersed in the charge is shifted as a function of the remaining volume of the charge such that the instantaneous height of fiber that is immersed in the charge remains substantially constant throughout the coating operation.

8 Claims, 2 Drawing Sheets

(56) References Cited

U.S. PATENT DOCUMENTS

2007/0110913 A1\* 5/2007 Franchet et al. ........... 427/430.1
2008/0292816 A1 11/2008 Franchet et al.
2011/0088618 A1 4/2011 Franchet et al.

\* cited by examiner

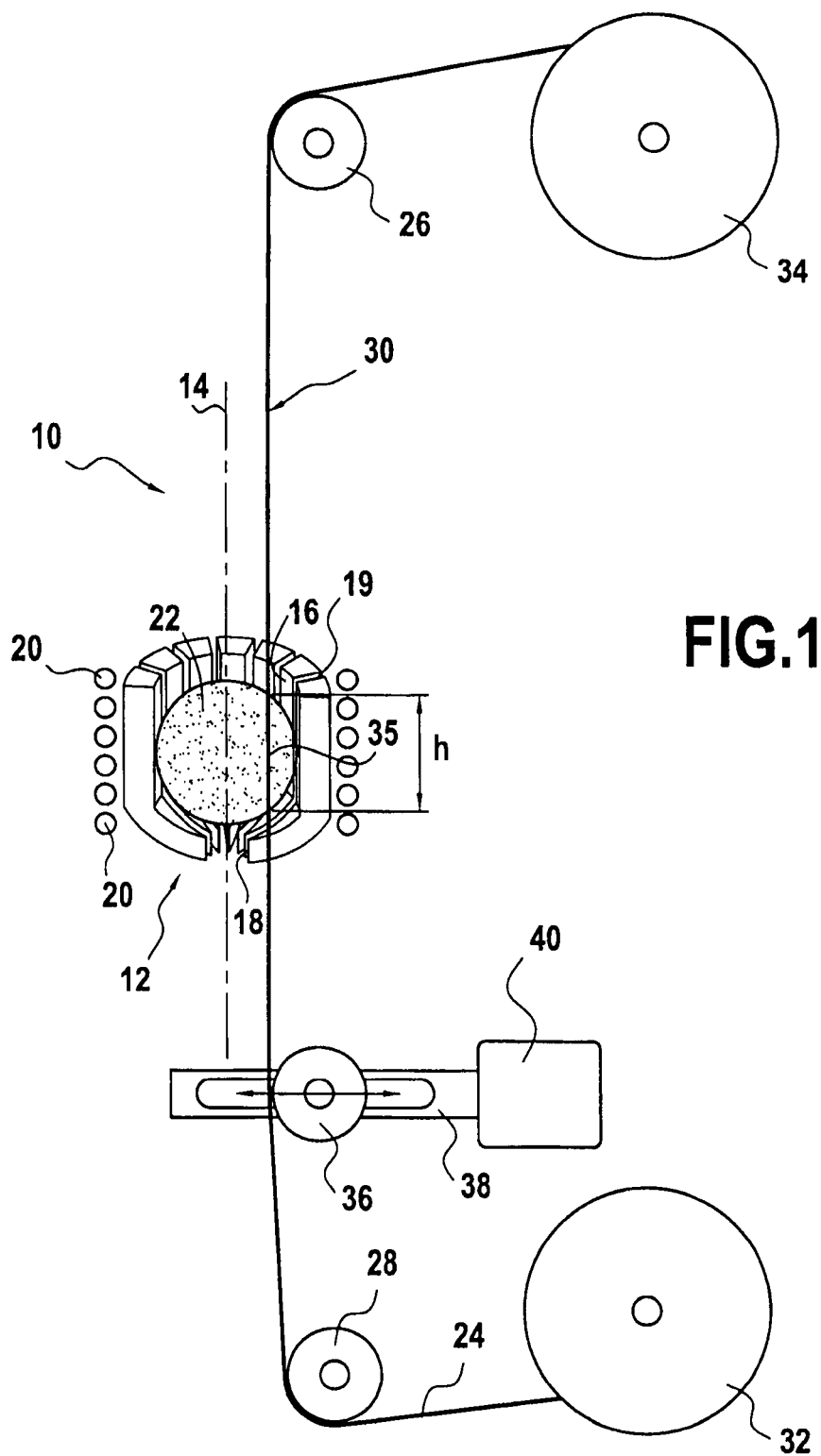

METHOD AND A DEVICE FOR COATING CERAMIC MATERIAL FIBERS IN METAL BY A LIQUID TECHNIQUE

BACKGROUND OF THE INVENTION

The present invention relates to the general field of metal matrix composite materials. More particularly, it relates to a method and to a device for coating ceramic material fibers in metal by a liquid technique.

One of the fields of application of the invention is that of aviation, and more precisely that of turbojets in which having recourse to metal matrix composite materials enables significant weight savings to be achieved.

In known manner, metal matrix composite materials are constituted by a matrix based on a metal alloy that is reinforced by fibers, the fibers being made of ceramic, for example. Such materials present high level performance in terms of stiffness and strength and they can be used instead of monolithic alloys in order to make turbojet parts such as disks for compressors or turbines, shafts, actuator cylinders, etc.

In advantageous manner, metal matrix composite materials can also be used for providing local reinforcement that is put into place in monolithic alloy parts such as blades, casings, spacers, etc. Under such circumstances, the reinforcement is generally fabricated from a half-finished product referred to as "coated fiber" that is constituted by a ceramic central core that is coated in a metal sheath.

The ceramic core of such coated fibers may be coated using a vapor technique in an electric field, e.g. by electrophoresis, or by coating using a liquid technique in a bath of liquid metal. For this purpose, document EP 0 931 846 describes a method of coating ceramic material fibers in metal by a liquid technique. That method consists essentially in maintaining a charge of molten metal in levitation inside a crucible, and in causing a tensioned fiber of ceramic material to travel through said charge. At the outlet from the bath of metal, the fiber is coated in a metal coating of thickness that depends in particular on the travel speed of the fiber.

In practice, it has been found that the quality of the coating obtained by that type of liquid coating method depends to a large extent on the instantaneous height of fiber that is immersed in the metal charge. As coating progresses, the weight of the charge decreases, thereby automatically reducing the instantaneous height of fiber that is immersed therein, if the position of the fiber in the crucible is kept constant. As a result, the thickness of the coating varies continuously along the coated fiber until the nominal conditions for coating are no longer satisfied, which means that coating must be interrupted. This means that for a given charge of metal, the quality of the resulting coating is acceptable over a limited length only of the fiber, which length is a function of the selected coating thickness. For example, for charges having a volume of 50 cubic centimeters ($cm^3$) and for a coating of small thickness, the length of coated fiber that presents quality that is acceptable may be several hundreds of meters. In contrast, for a thicker coating (of the order of 50 micrometers ($\mu m$)), the length of coated fiber that is of acceptable quality is no more than a few tens of meters.

Consequently, the quality of the coated fiber that is obtained by a liquid coating method, even though it remains acceptable, is not optimized insofar as the thickness of the coating is not constant over the entire length of the coated fiber. Correspondingly, the productivity of that type of coating method is relatively low since the length of coated fiber is limited.

In order to solve that problem and to make coated fibers of great length, proposals have been made to refill the bath of molten metal while coating is taking place by using powders, straws, or fibers. Nevertheless, that solution presents the drawback of being relatively expensive since means for delivering fibers or powders are themselves expensive. Furthermore, incorporating new matter into a given bath can lead to instabilities that are harmful to the coating process.

OBJECT AND SUMMARY OF THE INVENTION

A main object of the present invention is thus to mitigate such drawbacks by proposing a coating method and a coating device that enable coated fibers to be made that are of great length and of moderate cost.

This object is achieved by a method of coating ceramic material fibers in metal using a liquid technique, the method consisting in maintaining a charge of molten metal in levitation in a substantially spherical shape inside a crucible and in causing a tensioned ceramic material fiber to travel at a predetermined speed between a bottom pulley and a top pulley disposed on either side of the crucible in such a manner that a portion of fiber is immersed in the charge in order to be covered in a metal coating, the method being characterized in that it also consists in causing the portion of fiber that is immersed in the charge to shift during coating as a function of the remaining volume of the charge in such a manner that the instantaneous height of fiber that is immersed in the charge remains substantially constant throughout the coating operation.

Correspondingly, the invention also provides a device for coating ceramic material fibers in metal by a liquid technique, the device comprising: a crucible suitable for melting a charge of metal and for maintaining it in levitation in a substantially spherical shape; and a top pulley and a bottom pulley suitable for receiving a tensioned fiber of ceramic material and located on either side of the crucible so that a portion of a fiber traveling between the pulleys can be immersed in the charge in order to receive a metal coating; the device being characterized in that it further includes means for use during coating to shift the portion of fiber that is immersed in the charge as a function of the remaining volume of the charge in such a manner that the instantaneous height of fiber that is immersed in the charge remains substantially constant throughout the coating operation.

The invention thus proposes shifting the fiber thorough the charge of metal as a function of the reduction in its weight in such a manner as to keep constant the instantaneous height of fiber that is immersed. This solution presents numerous advantages. In particular, the length of coated fiber that is obtained by the method can be increased by a factor of at least 5 while using a single charge, i.e. without any need to incorporate new material. Furthermore, in the absence of any new material, the molten charge presents good uniformity and the quality of the coating is thereby improved. As a result, the method of the invention makes it possible to obtain coated fibers of good quality and of so-called "medium" lengths (i.e. lying in the range 200 meters (m) to 600 m for charges presenting a volume of 50 $cm^3$ and coatings presenting thicknesses of 50 $\mu m$), at a cost that is moderate. Greater lengths are possible by adapting the size of the crucible to the volume of the initial charge. Thus, lengths exceeding a kilometer can be obtained using charges of about 150 $cm^3$.

Furthermore, this method of the invention can be implemented while keeping all of the other parameters constant during coating. In particular, and advantageously, the travel speed of the fiber between the pulleys can be maintained substantially constant throughout coating, thereby avoiding problems with cooling of the coated fiber. Finally, in order to obtain coated fibers of very great length, this solution does not impede having recourse in parallel to the above-described technique that consists in refilling the metal batch.

In an advantageous provision, the shifting of the portion of fiber that is immersed in the charge takes place in a direction that is substantially perpendicular to the travel direction of the fiber. Under such circumstances, the portion of fiber that is immersed in the charge is shifted by means of at least one wheel interposed between one of the pulleys and the crucible and capable of shifting perpendicularly to the travel direction of the fiber.

In another advantageous provision, the portion of fiber that is immersed in the charge is shifted at a speed that is calculated as a function of the initial position of the portion of fiber in the charge, of the initial characteristics of the charge, of the travel speed of the fiber, and of the coating pick-up capacity of the fiber.

BRIEF DESCRIPTION OF THE DRAWINGS

Other characteristics and advantages of the present invention appear from the following description made with reference to the accompanying drawings which show an implementation having no limiting character. In the figures:

FIG. 1 is a diagrammatic view of the coating device of the invention; and

DETAILED DESCRIPTION OF AN EMBODIMENT

Figure 2A:
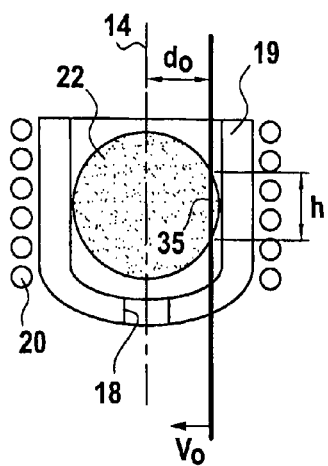
FIGS. 2A to 2C show an embodiment of the coating method of the invention.

FIG. 1 shows a device 10 of the invention for coating ceramic material fibers with metal by a liquid technique.

The device 10 comprises in particular a crucible 12 of the cold type, also referred to as a "levitation" crucible, that is designed to avoid contaminating the molten metal with the material that constitutes its own wall. This type of crucible is itself well known and is therefore not described in greater detail herein. If necessary, reference may be made to document EP 0 931 846 which describes an embodiment.

The crucible 12 is in the form of a bowl that is circularly symmetrical about a vertical axis 14. It has a top opening 16 that is larger than a bottom opening 18, these openings being circular and centered on the vertical axis 14. As shown in FIG. 1, it also includes a plurality of vertical slots 19 that extend between its openings 16 and 18. In known manner, these vertical slots 19 enable its electrical impedance to be matched and encourage cooling of the crucible.

The crucible 12 is also surrounded by a helical coil 20 that is also centered on the axis 14 and that is suitable for creating an electromagnetic field of characteristics that enable the liquid metal that is placed in the crucible to be maintained in levitation. A cooling circuit (not shown) is also positioned around the wall of the crucible in order to cool it.

A charge 22 of molten metal, e.g. of titanium alloy, presenting a shape that is substantially spherical is maintained in levitation at the appropriate temperature inside the crucible 12. The electromagnetic field created by the helical coil 20 serves to keep the surface of the charge 22 away from the wall of the crucible. While the charge is being melted, the fiber that is to be coated is kept outside the molten zone (stage not shown).

For coating purposes, a fiber 24 of ceramic material is initially tilted through the crucible 12 and is then kept under tension between a top loose pulley 26 and a bottom loose pulley 28, which pulleys are located on either side of the crucible and are positioned horizontally relative to each other in such a manner that the portion 30 of fiber that is tensioned between these pulleys extends, during coating, in a direction that is substantially parallel to the axis 14 and is immersed in the charge 22 of molten metal. These loose pulleys 26 and 28 serve to guide the fiber 24.

The coating device also includes a fiber delivery spool 32 that is located below the crucible 12, a spool 34 for receiving coated fiber that is disposed above the crucible, and means that are not shown for driving the spools in operation.

The operation of the coating device can be clearly understood from the above. Setting the spools 32 and 34 into rotation enables the fiber to be caused to travel at a predetermined speed between the loose pulleys 28 and 26. During coating, a portion 30 of the fiber passes right through the charge 22 of molten metal (upwards) and thus picks up liquid metal. On leaving the bath of metal, the fiber is coated in a metal coating with the thickness of the coating depending in particular on the predetermined speed at which the fiber travels between the pulleys.

Figure 2B:
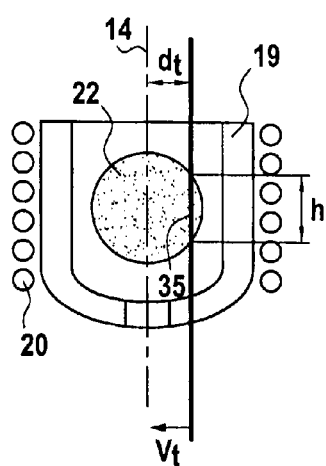
Figure 2C:
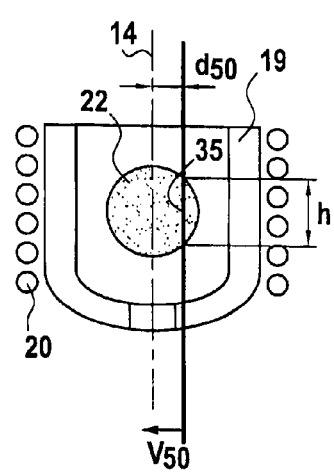

The device of the invention also includes means for operating during coating to shift the portion 35 of fiber that is immersed in the charge 22 of the molten metal as a function of the remaining volume of the charge. By way of example, these means may be in the form of a wheel 36 interposed between the crucible 12 and the bottom pulley 28, this wheel being shiftable along a rail 38 perpendicular to the travel direction of the fiber under drive from a motor 40. Using such a wheel, the position of the immersed portion 35 of fiber relative to the axis 14 can be modified by shifting the fiber in one of the vertical slots 19 of the crucible (FIGS. 2A to 2C). Naturally, a wheel could (as an alternative or in addition) be interposed between the crucible and the top pulley.

Furthermore, the wheel 36 is shifted along the rail 38 in such a manner that the instantaneous height h of the portion 35 of fiber that is immersed in the charge 22 of molten metal remains substantially constant throughout the coating operation. If the position of the fiber relative to the axis 14 remains unchanged during coating, and since the volume of the molten metal decreases as coating progresses, then the instantaneous height of the fiber that is immersed in the charge decreases necessarily.

In order to maintain the immersed height h constant, it is appropriate to servo-control the rate at which the wheel 36 shifts along the rail 38 to the volume of the charge 22 of molten metal as it varies during coating. An estimate of the volume of the charge during coating may be calculated on the basis of the following assumptions: the shape of the charge 22 remains spherical throughout coating, and the portion 35 of the fiber that passes through the charge can be taken to be a chord of the metal sphere. Thus, knowing the volume V(t) of the sphere of metal while coating is taking place, it is possible to deduce the radius r(t) thereof and thus the rate at which the fiber should be shifted in order to ensure that the instantaneous height h remains constant (the height h is a function in particular of r(t)).

With reference to FIGS. 2A to 2C, there follows the description of two implementations of such a calculation for the rate of shifting to be applied to the fiber to ensure that the instantaneous height h of immersed fiber remains constant.

These example calculations are performed for initial metal charges having respective volumes of 44 $cm^3$ and 120 $cm^3$, a constant instantaneous height h of 37.40 millimeters (mm), a travel speed of the fiber between the spools of 3 meters per second (m/s), and a charge pick-up rate of 3.3 cubic centimeters per minute (cm³/min).

The parameters obtained for the charge weighing 200 grams (g) are as follows:
- initial horizontal distance $d_0$ (at t=0 seconds (s)) between the immersed portion 35 of fiber and the axis 14 (step corresponding to FIG. 2A): 11.53 mm;
- initial rate of shifting $V_0$ applied to the fiber: 3.12 millimeters per minute (mm/min);
- final horizontal distance $d_{50}$ (at t=50 s) between the immersed portion 35 of fiber and the axis 14 (step corresponding to FIG. 2C): 8.41 mm; and
- final rate of shifting $V_{50}$ applied to the fiber: 4.44 mm/min.

For such a charge having a volume of 44 cm³, the wheel 36 shown in FIG. 1 must therefore be capable of shifting along the rail 38 at a rate lying in the range 3.12 mm/min to 4.44 mm/min.

As for the parameters obtained for the charge having a volume of 120 cm³, they are as follows:
- initial horizontal distance $d_0$ (at t=0 s) between the immersed portion 35 of fiber and the axis 14: 24.10 mm;
- initial rate of shifting $V_0$ applied to the fiber: 1.08 mm/min;
- final horizontal distance $d_{200}$ (at t=200 s) between the immersed portion 35 of fiber and the axis 14: 19.94 mm; and
- final rate of shifting $V_{200}$ applied to the fiber: 1.44 mm/min.

For this charge having a volume of 120 cm³, the wheel 36 must be capable of being shifted along the rail 38 at a rate lying in the range 1.08 mm/min to 1.44 mm/min. Compared with charges having a volume of 44 cm³, charges having a volume of 120 cm³ thus provide the advantage of requiring the wheel 36 to have a smaller range over which its rate of shifting needs to be regulated.

It should be observed that FIG. 2B shows an intermediate step between the initial and final steps of FIGS. 2A and 2C, in which intermediate step the distance between the immersed portion 35 of fiber and the axis 14 is written $d_t$ and the rate of shifting that is applied to the fiber is written $V_t$.

The invention claimed is:

1. A method of coating ceramic material fibers in metal using a liquid technique, the method comprising:
    maintaining a charge of molten metal in levitation in a substantially spherical shape inside a crucible;
    causing a tensioned ceramic material fiber to travel at a predetermined speed between a bottom pulley and a top pulley disposed on either side of the crucible such that a portion of fiber is immersed in the charge to be covered in a metal coating and a volume of the charge decreases; and
    causing the portion of fiber that is immersed in the charge to shift during coating as a function of the remaining volume of the charge such that instantaneous height of fiber that is immersed in the charge remains substantially constant throughout the coating,
    wherein the portion of fiber that is immersed in the charge is shifted by a wheel which is interposed between one of the pulleys and the crucible and which shifts perpendicularly to the travel direction of the fiber.

2. A method according to claim 1, wherein the shifting of the portion of fiber that is immersed in the charge takes place in a direction that is substantially perpendicular to the travel direction of the fiber.

3. A method according to claim 1, wherein the portion of fiber that is immersed in the charge is shifted at a speed that is calculated as a function of the initial position of the portion of fiber in the charge, of initial characteristics of the charge, of travel speed of the fiber, and of coating pick-up capacity of the fiber.

4. A method according to claim 1, wherein the metal is a titanium alloy.

5. A method according to claim 1, wherein the travel speed of the fiber between the pulleys is maintained substantially constant throughout coating.

6. A method according to claim 1, wherein the portion of fiber shifts from an outer edge of the charge of molten metal towards a center of the charge of molten metal as the volume of the charge decreases.

7. A method according to claim 1, wherein the wheel is shiftable along a rail perpendicular to the travel direction of the fiber.

8. A method according to claim 1, wherein the wheel is disposed between the crucible and the bottom pulley.

* * * * *